United States Patent

Leonardson et al.

[11] Patent Number: 5,996,411
[45] Date of Patent: *Dec. 7, 1999

[54] VIBRATING BEAM ACCELEROMETER AND METHOD FOR MANUFACTURING THE SAME

[75] Inventors: Ronald B. Leonardson; James R. Woodruff, both of Redmond, Wash.

[73] Assignee: AlliedSignal Inc., Morristown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/756,195

[22] Filed: Nov. 25, 1996

[51] Int. Cl.$^6$ .................................................... G01P 15/10
[52] U.S. Cl. ................................... 73/514.29; 73/514.37
[58] Field of Search ........................... 73/514.32, 514.36, 73/514.29, 514.15, 514.16, 514.35, 514.37, 862.59, DIG. 1, DIG. 4; 361/280; 257/417; 438/48

[56] References Cited

U.S. PATENT DOCUMENTS

| | | | |
|---|---|---|---|
| 4,718,275 | 1/1988 | Norling | 73/514.29 |
| 4,750,363 | 6/1988 | Norling | 73/514.29 |
| 4,838,369 | 6/1989 | Albert | 73/862.59 |
| 4,872,342 | 10/1989 | Hanson et al. | 73/514.29 |
| 4,879,914 | 11/1989 | Norling | 73/862.59 |
| 4,891,982 | 1/1990 | Norling | 73/514.29 |
| 4,901,586 | 2/1990 | Blake | 73/862.59 |
| 4,939,935 | 7/1990 | Amand | 73/514.29 |
| 5,005,413 | 4/1991 | Novack et al. | 73/514.29 |
| 5,006,487 | 4/1991 | Stokes | 437/228 |
| 5,113,698 | 5/1992 | Grlj et al. | 73/862.59 |
| 5,186,053 | 2/1993 | Egley et al. | 73/497 |
| 5,265,473 | 11/1993 | Funabashi | 73/514.15 |
| 5,289,719 | 3/1994 | Egley | 73/497 |
| 5,349,855 | 9/1994 | Bernstein et al. | 73/505 |
| 5,392,650 | 2/1995 | O'Brien et al. | 73/514.18 |
| 5,495,761 | 3/1996 | Diem et al. | 73/514.32 |
| 5,594,170 | 1/1997 | Peters | 73/514.29 |
| 5,656,778 | 8/1997 | Roszhart | 73/504.04 |
| 5,721,377 | 2/1998 | Kurle et al. | 73/504.12 |
| 5,723,353 | 3/1998 | Muenzel et al. | 438/48 |

FOREIGN PATENT DOCUMENTS

| | | | |
|---|---|---|---|
| 42 13 135 A1 | 10/1993 | Germany | G01P 15/08 |
| 44 24 635 A1 | 1/1996 | Germany | G01P 15/02 |
| 195 03 623 A1 | 8/1996 | Germany | H01L 49/00 |

*Primary Examiner*—Richard A. Moller

[57] ABSTRACT

An accelerometer formed from a semiconducting substrate and first and second active layers coupled to the opposite surfaces of the substrate. The substrate has a frame and a proof mass suspended from the frame by one or more flexures for rotation about an input axis in response to an applied force. The active layers each include a vibratory force transducer mechanically coupled to the proof mass for detecting a force applied to the proof mass. With this configuration, the transducers are located on either side of the substrate, which improves the differential design symmetry of the force detecting apparatus. This reduces the common mode non-linear response characteristics of the accelerometer, particularly in high dynamics applications, where high performance is required.

14 Claims, 10 Drawing Sheets

VIBRATING BEAM ACCELEROMETER AND METHOD FOR MANUFACTURING THE SAME

BACKGROUND OF THE INVENTION

The present invention relates generally to the detection and measurement of forces and more particularly to an improved accelerometer incorporating one or more vibrating force transducers for measuring the force applied to a proof mass. The present invention also relates to a method for manufacturing the accelerometer.

A widely used technique for force detection and measurement employs a mechanical resonator having a frequency of vibration proportional to the force applied. In one such mechanical resonator, one or more elongate beams are coupled between an instrument frame and a proof mass suspended by a flexure. An electrostatic, electromagnetic or piezoelectric force is applied to the beams to cause them to vibrate transversely at a resonant frequency. The mechanical resonator is designed so that force applied to the proof mass along a fixed axis will cause tension or compression of the beams, which varies the frequency of the vibrating beams. The force applied to the proof mass is quantified by measuring the change in vibration frequency of the beams.

Recently, vibratory force transducers have been fabricated from a body of semiconductor material, such as silicon, by micromachining techniques. For example, one micromachining technique involves masking a body of silicon in a desired pattern and then deep etching the silicon to remove portions thereof. The resulting three-dimensional silicon structure functions as a miniature mechanical resonator device, such as a rate gyroscope or an accelerometer that includes a proof mass suspended by a flexure. Existing techniques for manufacturing these miniature devices are described in U.S. Pat. Nos. 5,006,487, "Method of Making an Electrostatic Silicon Accelerometer" and 4,945,765 "Silicon Micromachined Accelerometer", the complete disclosures of which are incorporated herein by reference.

In one method of fabricating force detecting devices, a thin layer of silicon, on the order of about 20 micrometers thick, is epitaxially grown on a planar surface of a silicon substrate. The epitaxial layer is etched in a suitable plasma, to form the vibrating components of one or more vibratory force transducers (i.e., vibrating beams and electrodes). The opposite surface of the substrate is etched to form a proof mass suspended from a stationary frame by one or more flexure hinges. While the opposite surface of the substrate is being etched, the epitaxial layer is typically held at an electric potential to prevent undesirable etching of the epitaxial layer. The beams and the electrodes of the transducer are electrically isolated from the substrate by back biasing a diode junction between the epitaxial layer and the substrate. The transducer may then be coupled to a suitable electrical circuit to provide the electrical signals required for operation. In silicon, electrostatically driven, vibrating beam accelerometers, for example, the beams are capacitively coupled to an oscillating circuit.

The above-described method of manufacturing force detection devices suffers from a number of drawbacks. One such drawback is that the beams and electrodes of the vibratory force transducer(s) are often not sufficiently electrically isolated from the underlying substrate. At high operating temperatures, for example, electric charge or current may leak across the diode junction between the substrate and the epitaxial layer, thereby degrading the performance of the transducer(s). Another drawback with this method is that it is difficult to etch the substrate without etching the epitaxial layer (even when the epitaxial layer is held at an electric potential). This undesirable etching of the epitaxial layer may reduce the accuracy of the transducer.

Another drawback with existing force detection devices, such as accelerometers, is that they have often an asymmetrical design, which may reduce the accuracy of these devices, particularly in high performance applications. For example, the proof mass flexure hinge is typically etched on the opposite surface of the substrate to the transducers. This produces an asymmetrical device because the input axis of the accelerometer (i.e., the axis about which the proof mass rotates) is skewed relative to the center of the proof mass. In addition, the transducers are both typically formed on a surface of the active layer, thereby locating both transducers on one side of the proof mass hinge. This asymmetrical transducer design often creates non-linear response characteristics, which may be difficult to correct during high performance applications, such as aircraft and missile guidance.

What is needed, therefore, are improved apparatus and methods for detecting and measuring forces, such as the force resulting from the acceleration of a proof mass, and improved methods for manufacturing these force detecting apparatus. These methods and apparatus should effectively electrically isolate the vibratory force transducers from the proof mass and instrument frame to improve transducer performance at high operating temperatures. In addition, the force detecting apparatus should be designed more symmetrically to increase the accuracy of the transducers, particularly in high performance applications.

SUMMARY OF THE INVENTION

The present invention provides methods and apparatus for detecting and measuring forces with mechanical resonators and improved methods of manufacturing these force detecting apparatus. The methods and apparatus of the present invention are useful in a variety of applications, such as angular rate sensors and gyroscopes, and particularly useful for measuring acceleration, such as the acceleration of a miniature proof mass in a micromachined accelerometer.

The apparatus of the present invention includes a semiconducting substrate and first and second active layers coupled to the opposite surfaces of the substrate. The substrate has a frame and a proof mass suspended from the frame by one or more flexures for rotation about an input axis in response to an applied force. The active layers include symmetrical vibratory force transducers mechanically coupled to the proof mass for detecting a force applied to the proof mass. With this configuration, the transducers are located on either side of the substrate (i.e., on either side of the input axis). Fabricating the transducers on opposite sides of the input axis improves the differential design symmetry of the force detecting apparatus. When signals are combined, this differential design symmetry reduces non-linear response characteristics, particularly in high performance applications where high vibration is present.

In a specific configuration, an insulating layer is formed between the substrate and the active layers to insulate the active layers from the substrate. Providing separate insulating layers between the substrate and active layers improves the electrical insulation between the proof mass and the transducers, which allows for effective operation over a wide range of temperatures. Preferably, the substrate and active layers are made from a silicon or polysilicon material, and the insulating layers comprise a thin layer (e.g., about 0.1 to 10 micrometers) of oxide, such as silicon oxide. The silicon oxide layers retain their insulating properties over a wide temperature range to ensure effective transducer performance, for example, at high operating temperatures on the order of above about 70° C. In addition, the insulating layers inhibit undesirable etching of the active layers while the substrate is being etched, which improves the accuracy of the apparatus. In one embodiment, the substrate comprises a single, double-sided Silicon-On-Insulator (SOI) substrate having oxide layers and active layers on either side of the substrate. In another embodiment, a pair of single-sided SOI substrates (i.e., each substrate having a single oxide layer and active layer on one side) are bonded together, preferably by molecular level thermal bonding techniques, such as anionic bonding.

In a preferred configuration, the flexure hinges of the proof mass are located near or at the center of the silicon substrate that comprises the proof mass (i.e., substantially centered between the first and second surfaces of the substrate). This arrangement locates the input axis of the device substantially in the center of mass of the substrate, thereby reducing the skew of the input axis relative to the mass of the proof mass and improving the accuracy of the apparatus. The vibratory force transducers may be disposed on the hinge side of the proof mass, on the opposite side of the proof mass, or on both sides of the proof mass. In the preferred configuration, the transducers are disposed on opposite sides of the proof mass to improve the differential symmetry of the device.

In an exemplary embodiment, the force detection apparatus comprises an accelerometer for measuring the acceleration of the proof mass relative to the stationary frame. In this embodiment, the active layers each include a vibratory force transducer coupled to the proof mass. The vibratory force transducer each preferably include first and second parallel beams each having a first end portion fixed to the proof mass, a second end portion fixed to the instrument frame and a resonating portion therebetween. The transducers each further include first and second electrodes positioned adjacent to and laterally spaced from the first and second beams. Oscillator circuits are capacitively coupled to the electrodes of each transducer for electrostatically vibrating the beams and for determining the magnitude of a force applied to the proof mass based on the vibration frequency of the beams. Since the accelerometer of the present invention employs differential (i.e., push-pull) symmetrical detection, the difference signal provides a direct measurement of applied force and effectively eliminates common mode error effects.

The accelerometer of the present invention is manufactured by forming a semiconducting substrate having insulating layers of silicon oxide on opposite surfaces. The substrate may be formed by depositing the silicon oxide layers on opposite surfaces of the substrate (i.e., a double sided SOI substrate), or by depositing the silicon oxide layers onto one surface of two substrates and bonding the substrates together. First and second active layers of semiconducting material are then bonded, e.g., with high temperatures, onto the silicon oxide layers on either side of the substrate so that the silicon oxide layers insulate the substrate from the active layers. In a preferred configuration, portions of the active layers will be removed after they have been bonded to the substrate to provide relatively thin active layers of about 5 to 40 micrometers. The proof mass and instrument frame are then etched into the substrate and first and second transducers are etched, preferably with reactive ion etching, into the first and second active layers, respectively. The insulating layers inhibit undesirable etching of the active layers while the substrate is being etched and vice versa. After the accelerometer's components are formed into the silicon wafers, the transducer beams are mechanically coupled to the proof mass and the frame, and the electrodes are capacitively coupled to a suitable external oscillator circuit.

Other features and advantages of the invention will appear from the following description in which the preferred embodiment has been set forth in detail in conjunction with the accompanying drawings.

DESCRIPTION OF THE SPECIFIC EMBODIMENTS

Figure 1:
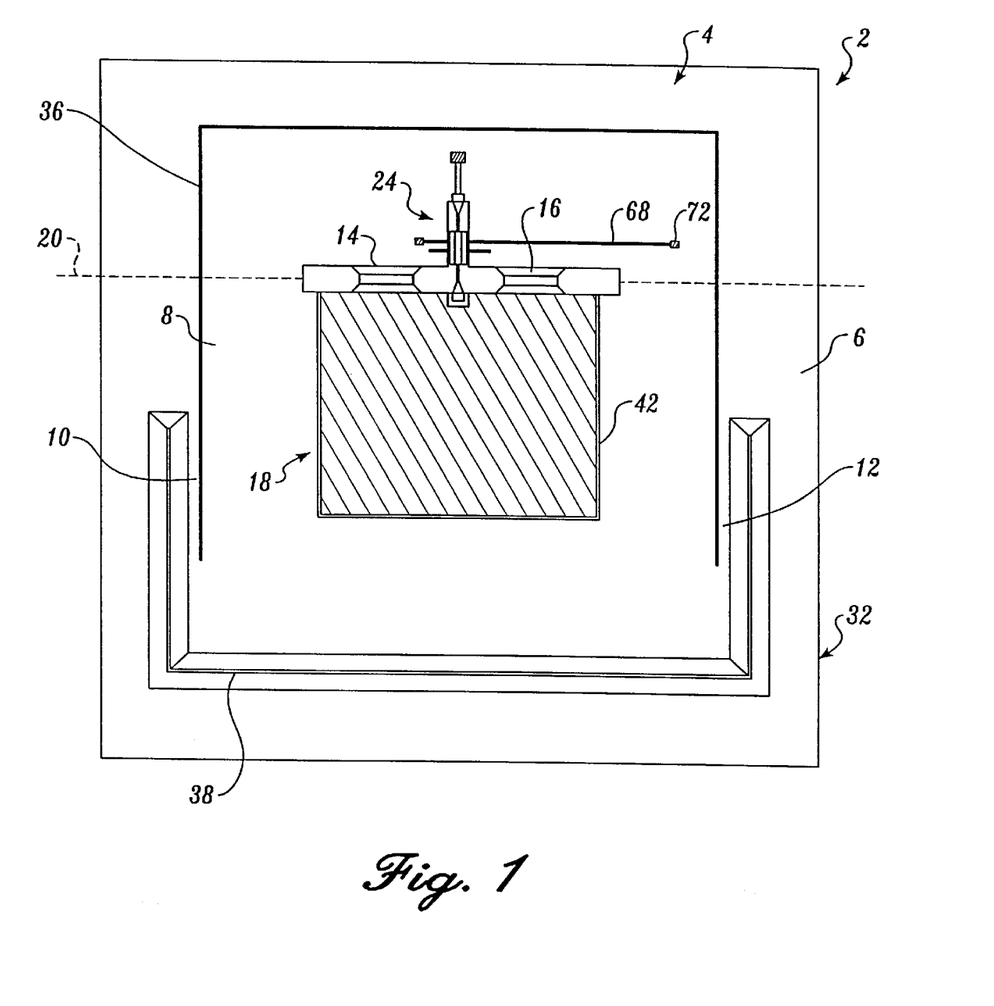
FIG. 1 is a schematic top view of a micro silicon accelerometer manufactured according to the principles of the present invention.
Figure 2A:
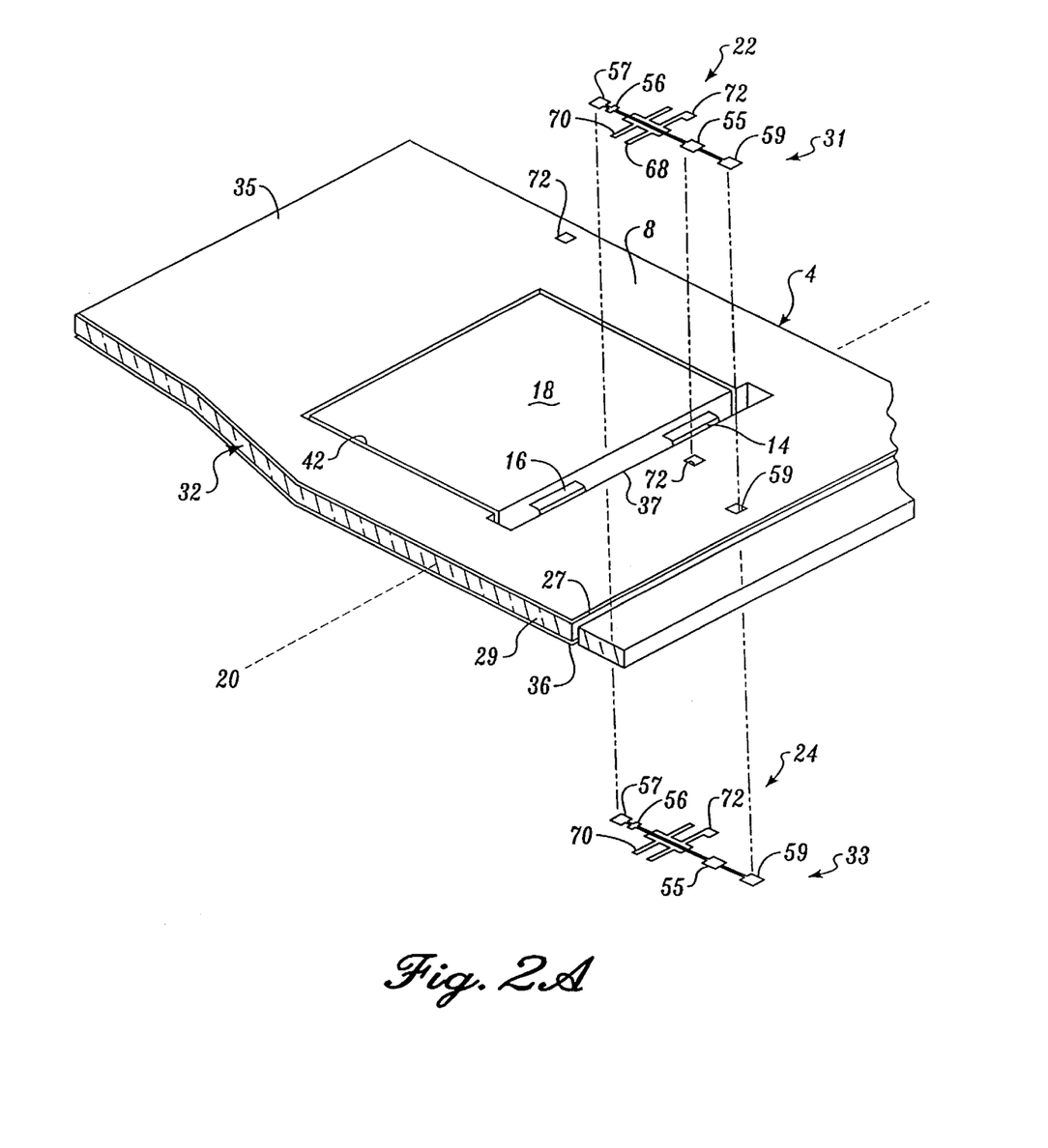
FIG. 2A is an exploded view of the accelerometer of FIG. 1.

Referring to the figures, wherein like numerals indicate like elements, a representative force detecting system or accelerometer 2 is illustrated according to the present invention. Accelerometer 2 is a miniature structure fabricated from a body of semiconductor material by micro-machining techniques. As shown in FIG. 1, accelerometer 2 is preferably formed from a monocrystalline silicon body 4 that includes a pair of inner flexures 14, 16 supporting a proof mass 18 for movement of the proof mass 18 about a hinge axis 20 parallel to the plane of body 4. Proof mass 18 will move about hinge axis 20 in response to an applied force, such as the acceleration of the vehicle, aircraft or the like that houses accelerometer 2. Accelerometer 2 includes a pair of vibratory force transducers 22, 24 (note that transducer 24 is shown in FIG. 2A) coupled to proof mass 18 and to body 4 for measuring forces applied to proof mass 18 (discussed in detail below). An oscillator circuit (FIG. 6) electrostatically drives transducers 22, 24 at their resonance frequency. When a force is applied to proof mass 18, mass 18 will rotate about hinge axis 20, causing axial forces (compressive or tensile) to be applied to transducers 22, 24. The axial forces change the frequency of vibration of transducers 22, 24 and the magnitude of this change serves as a measure of the applied force.

Referring to FIG. 2A, silicon body 4 comprises a substrate 32 defining upper and lower (first and second opposing) surfaces 27, 29, and first and second insulating layers 35, 36 deposited on upper and lower surfaces 27, 29 respectively (note that the terms "upper" and "lower" are used only to differentiate between the two surfaces, and do not specifically refer to the orientation of accelerometer 2 when it is mounted into a vehicle). Silicon body 4 further comprises upper and lower active layers 31, 33 electrically isolated from substrate 32 by insulating layers 35, 36. Active layers 31, 33 preferably comprise a semiconducting material, such as a silicon wafer. Insulating layers 35, 36 each preferably comprise a thin layer (e.g., about 0.1 to 10.0 micrometers) of oxide, such as silicon oxide. Layers 35, 36 however, may also comprise other suitable insulating layers. The silicon oxide layers 35, 36 retain their insulating properties over a wide temperature range to ensure effective transducer performance at, for example, high operating temperatures on the order of above about 70° C. In addition, the insulating layers 35, 36 inhibit undesirable etching of active layers 31, 33 while substrate 32 is being etched (and vice versa), which improves the accuracy of the apparatus.

Figure 7:
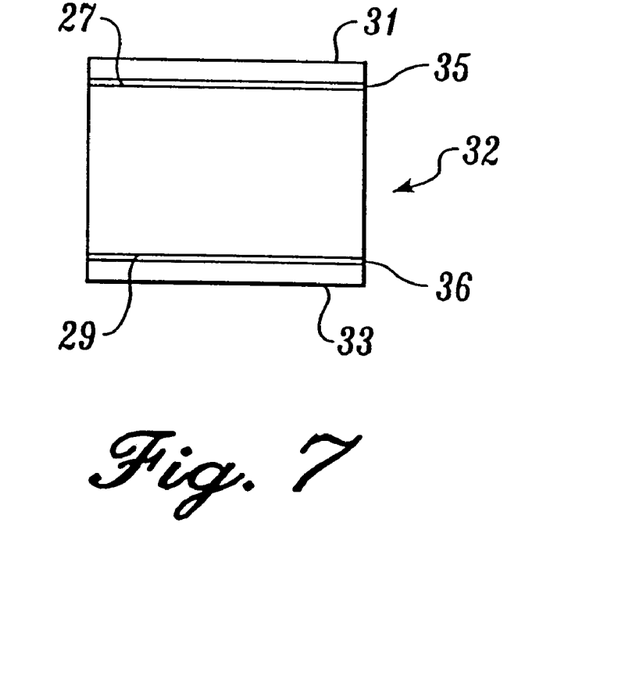
FIG. 7 is schematically illustrate a double-sided accelerometer manufactured according to the present invention.
Figure 8:
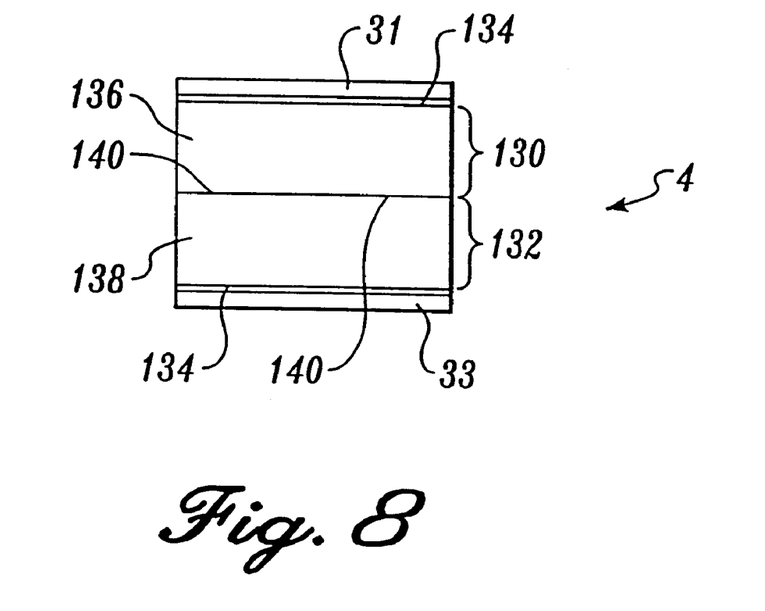
FIG. 8 schematically illustrates another embodiment of a double-sided accelerometer manufactured with two single sided substrates bonded together according to the present invention.

Silicon body 4 is preferably formed by oxidizing upper and lower surfaces 27, 29 of substrate 32 to form a double-sided Silicon-On-Insulator (SOI) substrate 32, and then adhering active layers 31 to insulating layers 34 (see FIG. 7). Active layers 31, 33 may also include insulating layers (not shown) that are bonded to insulating layers 35, 36, e.g., by high temperature bonding techniques. Alternatively, a pair of single-sided SOI substrates 130, 132 may be formed by oxidizing the upper surfaces 134 of two silicon substrates 136, 138, as shown in FIG. 8. The lower surfaces 140 of substrates 136, 138 are then bonded together to form silicon body 4, as discussed in further detail below.

As shown in FIG. 2A, proof mass 18 is formed from substrate 32 by etching a slot 42 through substrate 32 and suitably etching around inner flexures 14, 16. Transducers 22, 24 and the appropriate electrical bonds 59, 72 (discussed below) for coupling transducers 22, 24 to oscillator circuit 30 are formed on active layers 31, 33 by suitable etching techniques, such as reactive ion etching, anisotropic etching or the like. In one embodiment, openings (not shown) are formed in insulating layers 35, 36 to electrically couple electrical bonds 59, 72 of transducers 22, 24 to substrate 32 and to mechanically couple transducers 22, 24 to proof mass 18 and inner frame 8. Alternatively, electrical bonds 59, 72 may be directly coupled to oscillator circuit 30. In the preferred embodiment, the remaining portions (not shown) of active layers 31, 33 are then removed to minimize disturbances to the active components.

Figure 9:
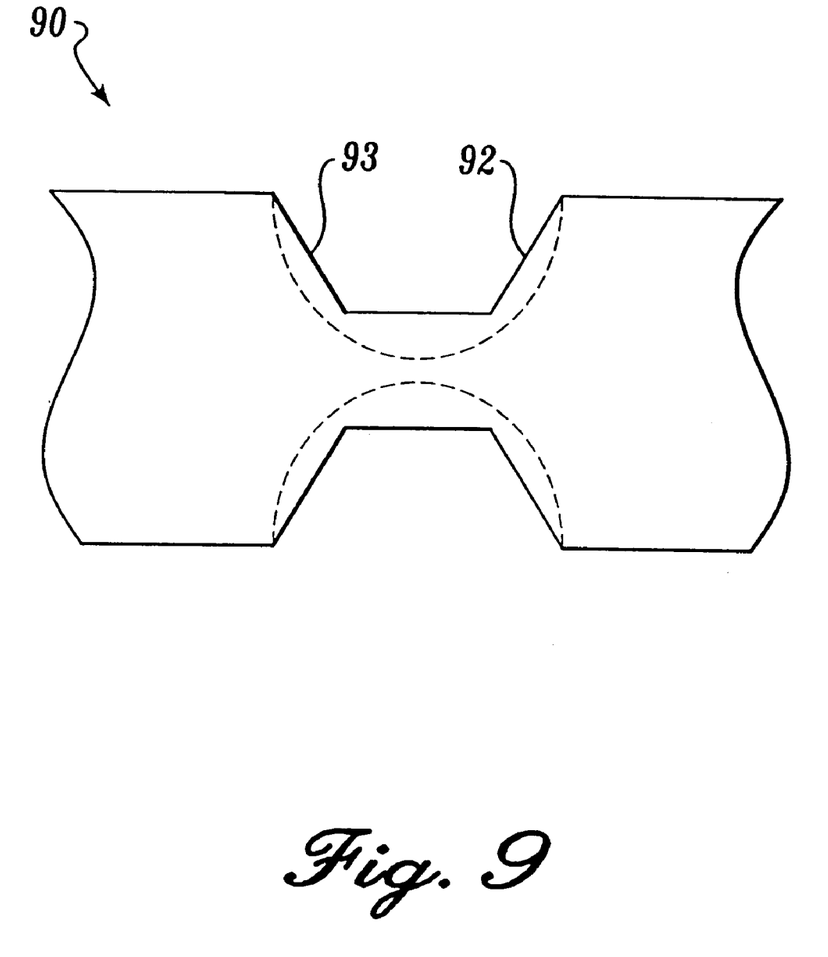
FIG. 9 illustrates an exemplary right circular flexure hinge for use with the present invention.

As shown in FIG. 2A, inner flexures 14, 16 are preferably etched near or at the center of the silicon substrate 32 (i.e., substantially centered between upper and lower surfaces 27, 29). Preferably, flexures 14, 16 are formed using time etching techniques, which entails precision timed etching from both surfaces to form thin flexure hinges. This arrangement provides an input axis 20 (i.e., the axis about which proof mass 18 rotates in response to an applied force) that extends substantially through the center of mass of substrate 32, which reduces the skew of the input axis 20 relative to the mass of the proof mass 18, thereby improving the accuracy of accelerometer 2. Flexures 14, 16 are preferably spaced from each other and define an effective hinge point 37 centered therebetween. Alternatively, a single flexure (not shown) may be formed at hinge point 37. Preferably, flexures 14, 16 are designed to limit S-bending. To this end, flexures 14, 16 will have a short length, or they will each comprise a right circular optimized hinge. As shown in FIG. 9, a pseudo right circular hinge 90 may be formed by precision time etching along etch planes 92, 93. Separate etching may also be performed to round the hinge geometry to form an ideal right circular hinge (shown in dotted lines).

Figure 2B:
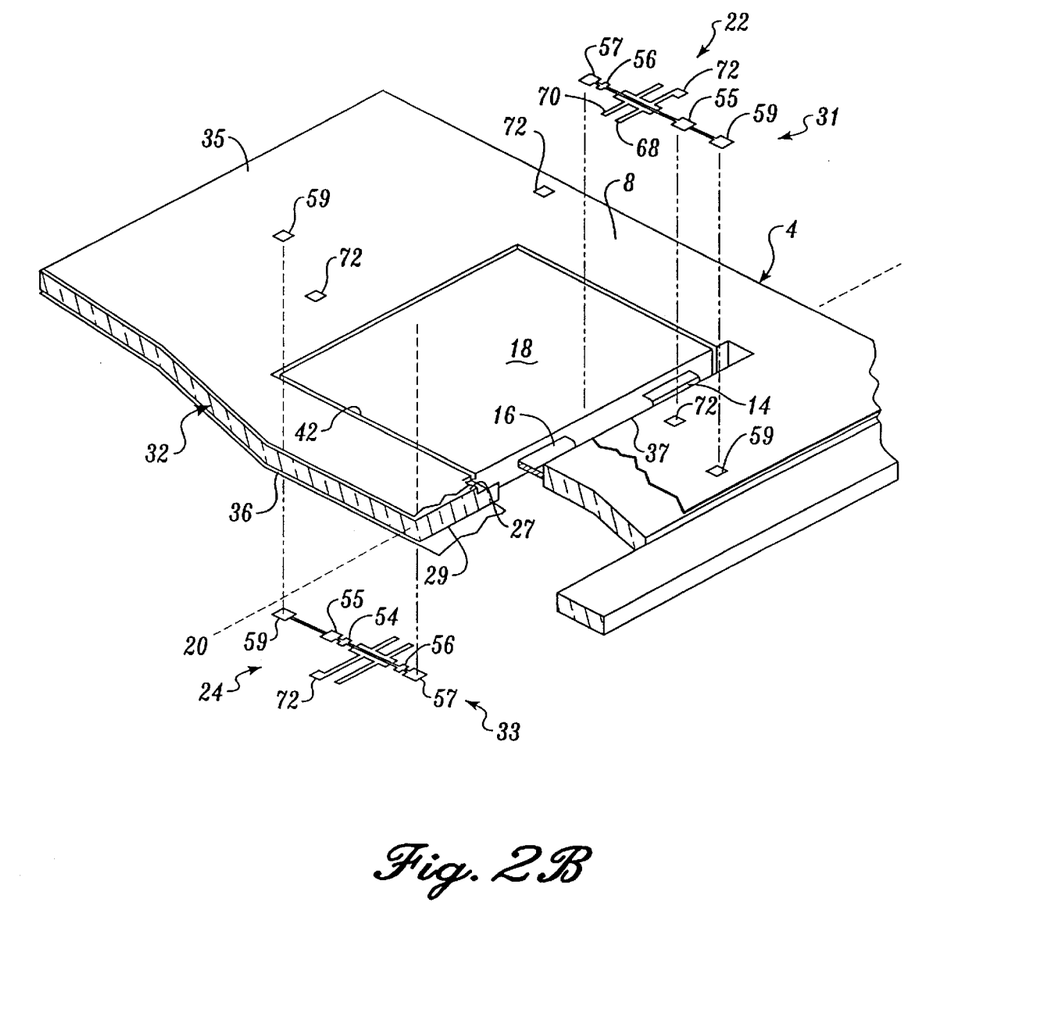
FIGS. 2B–2D are exploded views of alternative accelerometers according to the present invention.
Figure 2C:
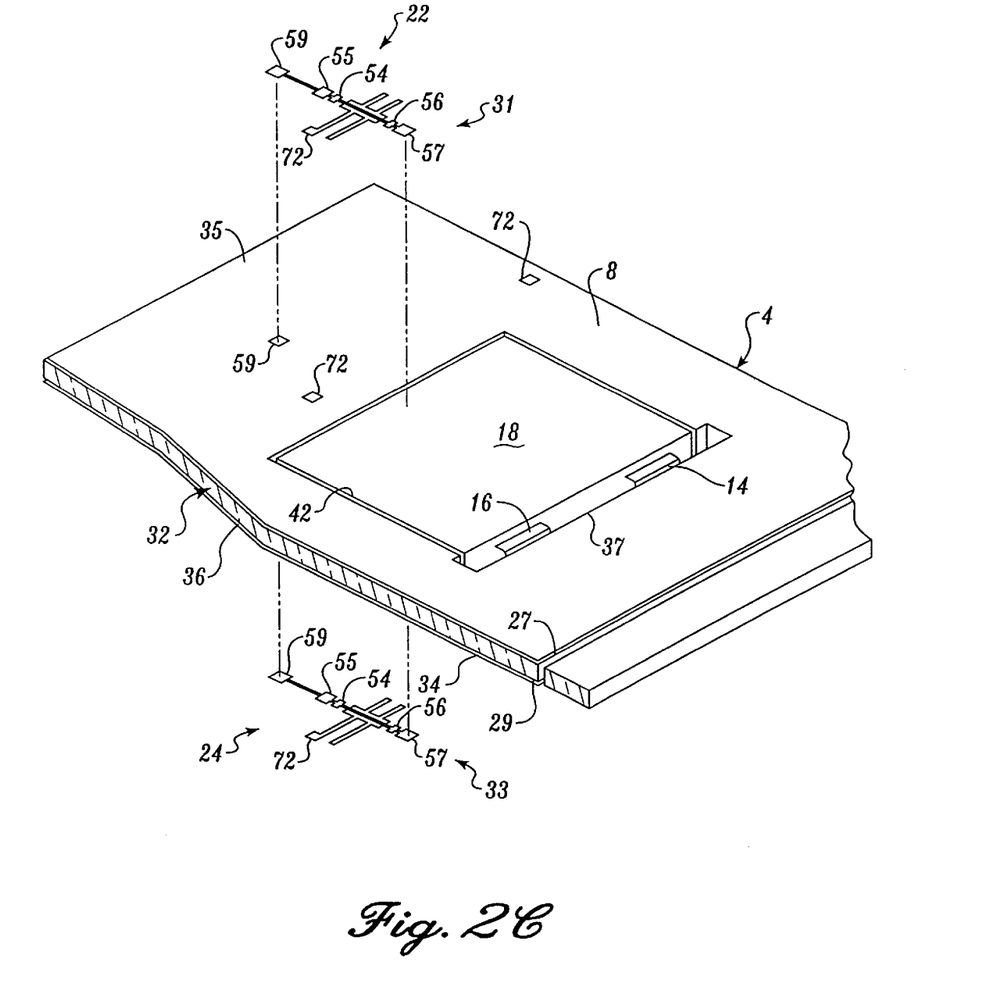
Figure 2D:
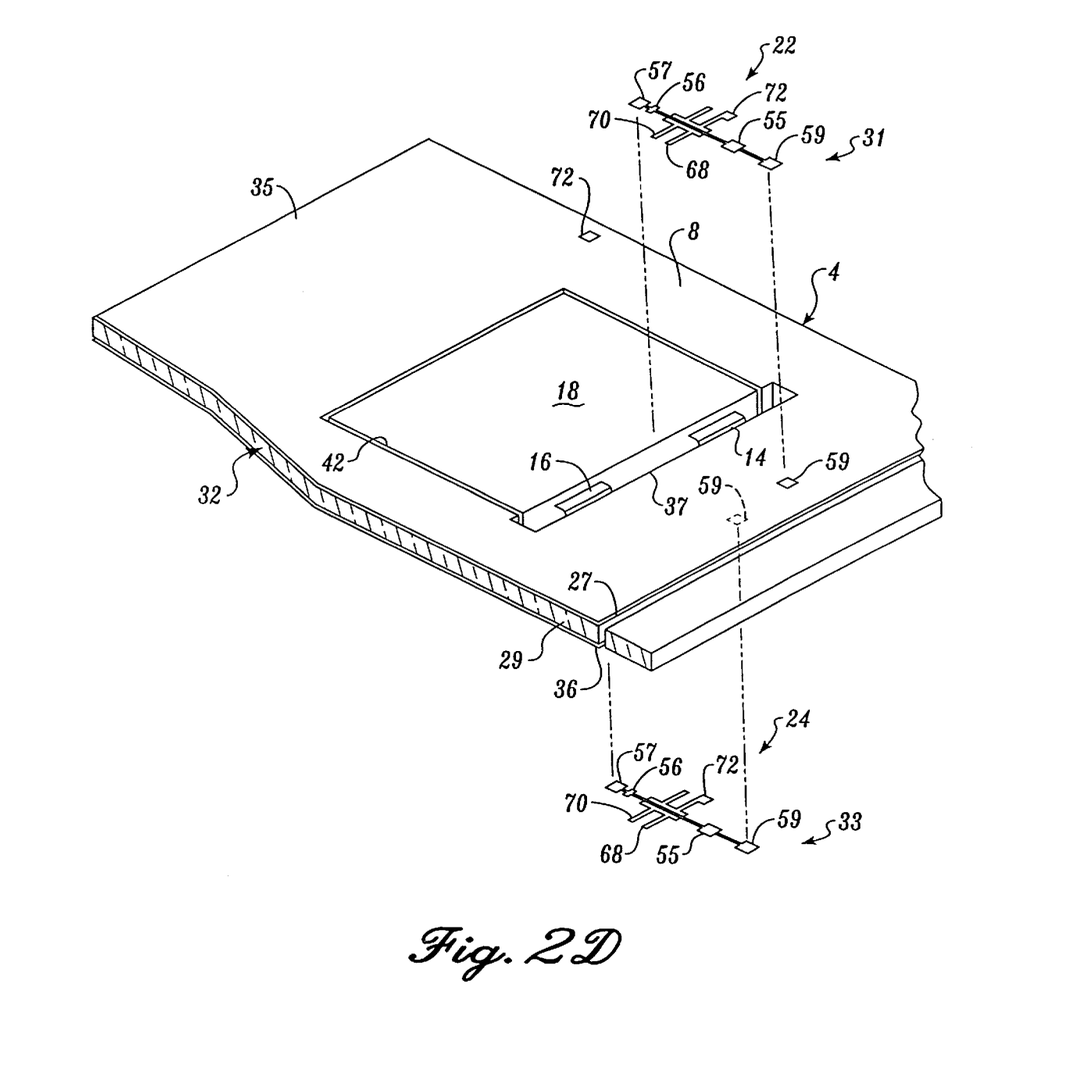

As shown in FIG. 2A, vibratory force transducers 22, 24 are preferably located on either surface of proof mass 18. Thus, transducer 22 is directly located over the effective hinge point 37 and transducer 24 is located directly below the hinge point 37 on the opposite surface of substrate 32. This configuration improves the differential symmetry of accelerometer 22 and provides optimal common mode operation. Alternatively, transducer 24 may be located on the opposite side of proof mass 18, as shown in FIG. 2B. In yet another alternative, both transducers 22, 24 are both located opposite hinge point 37. Of course, it will be recognized by those skilled in the art that present manufacturing techniques may make it difficult to locate the vibratory force transducers 22, 24 directly above and below the effective hinge point 37. Thus, transducers 22, 24 may be horizontally offset on either side of hinge point 37, as shown in FIG. 2D.

Referring again to FIG. 1, outer and inner frames 6, 8 are formed on substrate 32 by etching slots 36, 38 through substrate 32. Slots 36, 38 overlap each other to form flexures 10, 12 so that inner and outer frames 6, 8 are movable relative to each other. Outer frame 6 is usually coupled to a package mounting surface (not shown), which, in turn, is typically connected to an external package interface mount (not shown). Since the package and outer frame 6 are fabricated from different materials, they will usually have substantially different coefficients of thermal expansion when heated. This thermal mismatching may cause undesirable stresses and strains at the interface of outer frame 6 and the package, causing a slight distortion of outer frame 6. Flexures 10, 12 allow inner frame 8 to move relative to outer frame 6 to minimize the distortion of inner frame 8 and thereby decrease the effects of thermal mismatching on transducers 22, 24.

Figure 3:
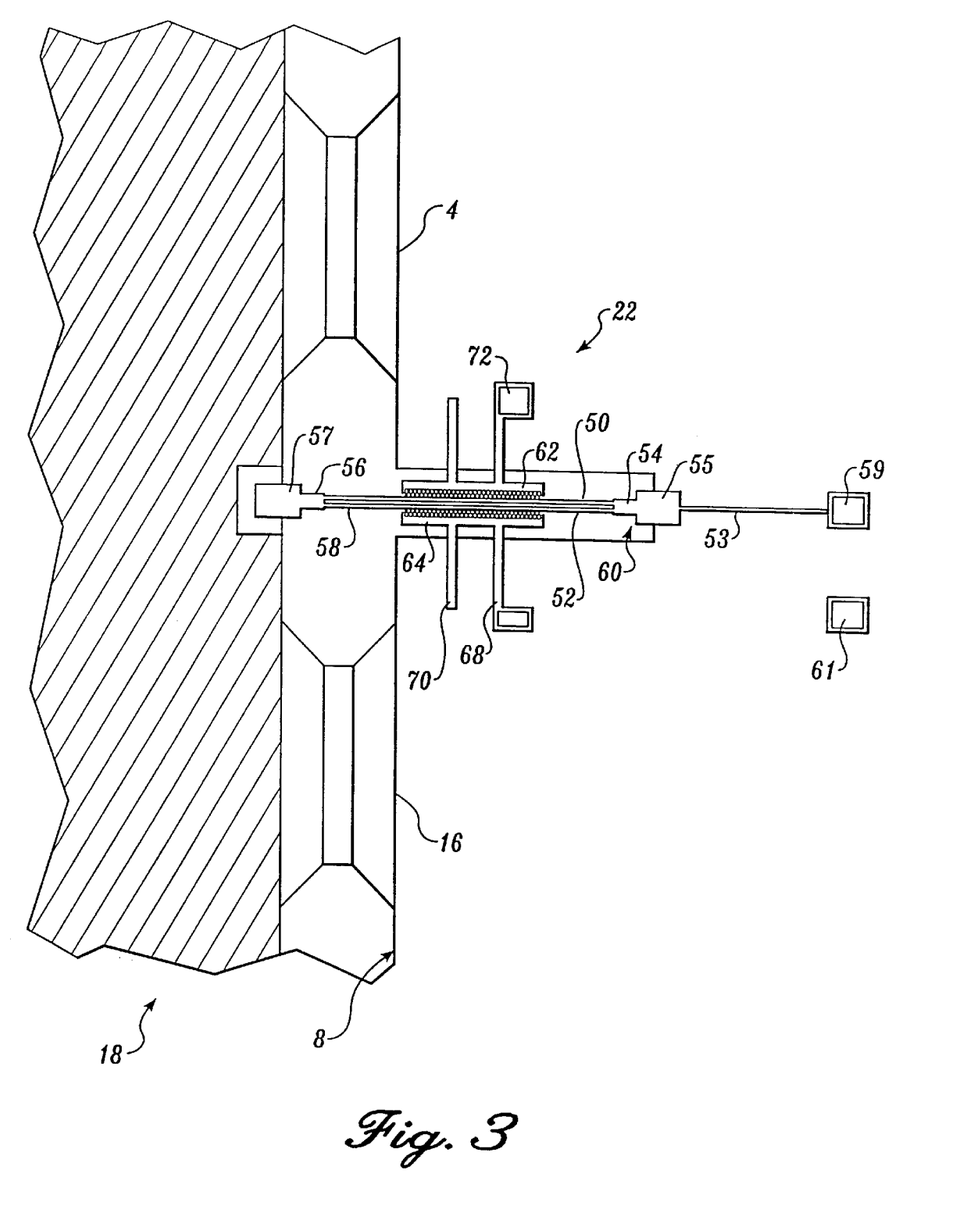
FIG. 3 is an enlarged view of a portion of the accelerometer of FIG. 1, illustrating an exemplary vibratory force transducer.
Figure 4:
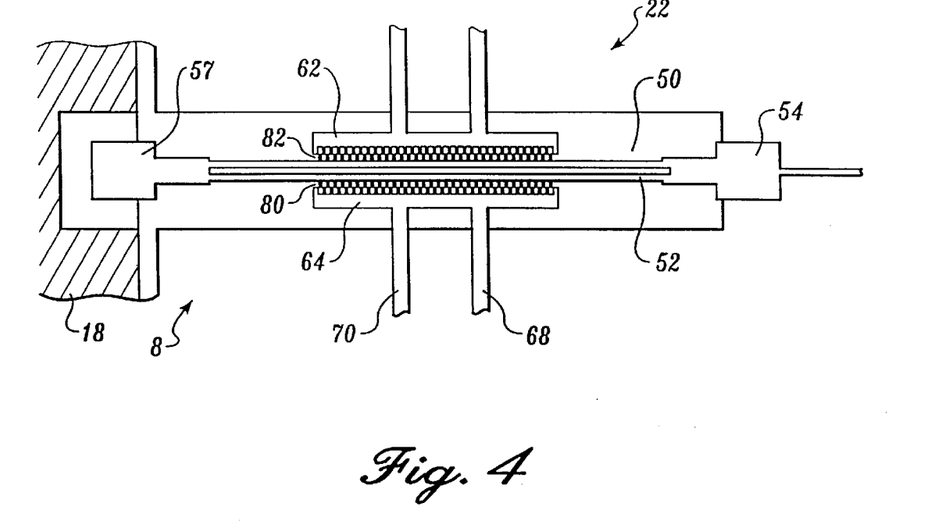
FIG. 4 is an enlarged view of the vibratory force transducer of FIG. 3.
Figure 5:
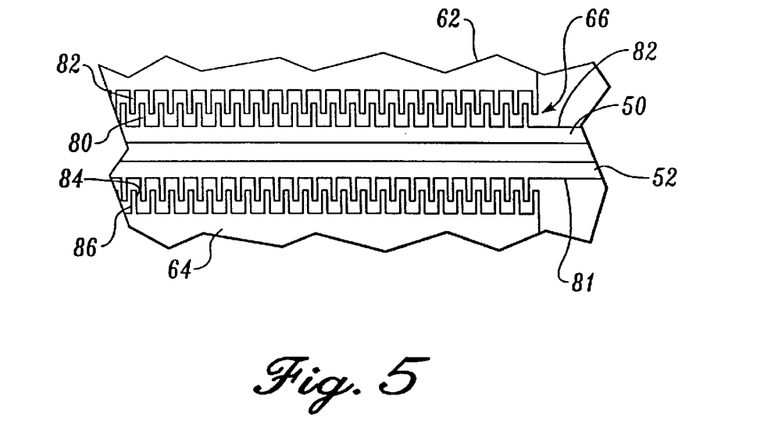
FIG. 5 is a further enlarged view of the vibratory force transducer, illustrating the intermeshed projecting fingers of the present invention.

Referring to FIGS. 3–5, one of the vibratory transducers 22 will now be described in detail. Vibratory transducer 22 comprises a pair of generally parallel beams 50, 52 coupled together at enlarged or widened end portions 54, 56 and separated from each other by a slot 58 to form a double ended tuning fork. Beams 50, 52 are preferably formed from active silicon layer 31 and separated from substrate 32 so that the beams may be vibrated laterally relative to fixed end portions 54, 56 (discussed below). End portions 54, 56 are suitably bonded to proof mass 18 and body 4, respectively, by mounting pads 55, 57. Widened end portions 54, 56 are provided to mechanically couple the vibrating beams 50, 52 to each other. Slot 58 will usually have a width of about 10 to 30 microns and a length of about 1000 to 2000 microns. However, it will be understood that these dimensions may vary depending on the design.

Of course, it should be recognized that the present invention is not limited to the double-ended tuning fork described above and shown in FIGS. 3–5. For example, accelerometer 2 may incorporate a single beam or a variety of other mechanical resonator arrangements. However, a double-ended tuning fork arrangement is generally preferred because beams 50, 52 can be driven laterally in opposite directions relative to each other. Driving beams 50, 52 in opposite directions minimizes the transfer of energy from the moving beams to the rest of the components in accelerometer 2, which increases the effectiveness of the transducer.

Transducers 22, 24 each further include an electrostatic drive for laterally vibrating beams 50, 52 at the resonance frequency. The electrostatic drive includes a pair of elongate electrodes 62, 64 located on either side of beams 50, 52, respectively. Electrodes 62, 64 are generally parallel to and laterally spaced from beams 50, 52 by a gap 66 (see FIG. 5). Electrodes 62, 64 are etched from active layer 31 and doped with a suitable conductive material to create the necessary charge carriers and to facilitate completion of the electrical circuit. Alternatively, electrodes 62, 64 may be formed from an electrically conductive material, such as gold, that is bonded to active layer 31.

As shown in FIGS. 1 and 3, each electrode 62, 64 is supported by a pair of support arms 68, 70 extending laterally away from beams. Support arms 68, 70 serve to minimize vibrations in electrodes 62, 64. One of the support arms 68 on each electrode 62, 64 is coupled to a bonding pad 72 for electrically coupling electrodes 62, 64 to oscillation circuit 30 (see FIG. 5). Mounting pad 57 is coupled to an arm 53 that electrically couples beams 50, 52 to a bonding pad 59. Bonding pad 59 is suitably coupled to oscillation circuit 30 to complete the electrical circuit with electrodes 60, 62 and beams 50, 52. As shown in FIG. 2A, substrate 32 may also include a bonding pad 61 for electrically connecting substrate 32 to a ground. Bonding pads 59, 61 and 72 are formed from a suitable conductive material, such as gold.

Referring now to FIGS. 4 and 5, beams 50, 52 each include a plurality of fingers 80 projecting outward from a lateral surface 81 of each beam 50, 52 toward the corresponding electrode 62, 64. Likewise, electrodes 62, 64 each include a plurality of fingers 82 projecting laterally inward so that beam fingers 80 and electrode fingers 82 are intermeshed with each other. Fingers 80, 82 are each sized so that their ends 84 will not contact beams 50, 52 or electrodes 62, 64 when beams 50, 52 are laterally vibrated relative to electrodes 62, 64. Usually, fingers 80, 82 will have a length of about 20 to 60 microns and preferably about 35 to 45 microns so that fingers 80, 82 overlap each other in the lateral direction by about 5–20 microns. Electrode fingers 82 and beam fingers 80 are axially spaced from each other by a suitable distance to provide electric capacitance therebetween. Usually, electrode and beam fingers 82, 80 will be spaced by about 2 to 10 microns from each other and preferably about 4 to 8 microns. Since beam fingers 80 are axially spaced from electrode fingers 82, the distance between these fingers will generally remain constant as beams 50, 52 vibrate in the lateral direction.

Electrostatic force is generally proportional to the square of the charge, which is proportional to the voltage and to the capacitance between the beam and the electrode. The capacitance is inversely proportional to the distance between the beam and the electrode. Accordingly, the electrostatic force is proportional to the square of the voltage and inversely proportional to the square of the distance between the beam and the electrode. Thus, changes in the distance between the beam and the electrode will typically change the electrostatic force. In fact, this change in the electrostatic force often acts as an electrical spring that works opposite to the elastic force or mechanical spring of the beams to lower the resonance frequency. For example, as the beam moves from its rest position closer to the electrode, the electrostatic force increases, the change in force working opposite to the elastic force of the beam. When the beam moves from its rest position away from the electrode, the electrostatic force decreases, so that the change in electrostatic force again works against the elastic restoring force of the beam. This lowers the resonance frequency of the beam by a factor related to the magnitude of the bias voltage. Accordingly, the resonant frequency of the beams is generally sensitive to changes in the bias voltage.

In the present invention, the distance between intermeshed beam and electrode fingers 80, 82 remains substantially constant as the beams 50, 52 vibrate relative to the stationary electrodes 62, 64. The electrostatic force between the beams and the electrodes is generally proportional to the change in capacitance with distance. Since the capacitance between the intermeshed electrode and beam fingers changes linearly with the motion of the beams, the electrostatic force will remain substantially constant as the beams move toward and away from the electrodes. Accordingly, the electrostatic force will remain substantially constant during vibration of beams 50, 52 and, therefore, will not work against the mechanical spring of the beams 50, 52 to lower the resonance frequency. Thus, the sensitivity to changes in bias voltage is decreased with the present invention. Applicant has found that this sensitivity is reduced by 5 to 10 times compared to a similar resonator that does not incorporate intermeshed fingers. Reducing the sensitivity of the resonance frequency to changes in bias voltage increases the accuracy of the vibratory force transducer. In addition, this allows the transducer to effectively operate with higher bias voltage levels, which results in a larger signal-to-noise ratio and requires less amplifier gain in the oscillator circuit. Usually, a bias voltage of about 50 to 150 Volts will be applied between electrodes 62, 64 and beams 50, 52.

Figure 6:
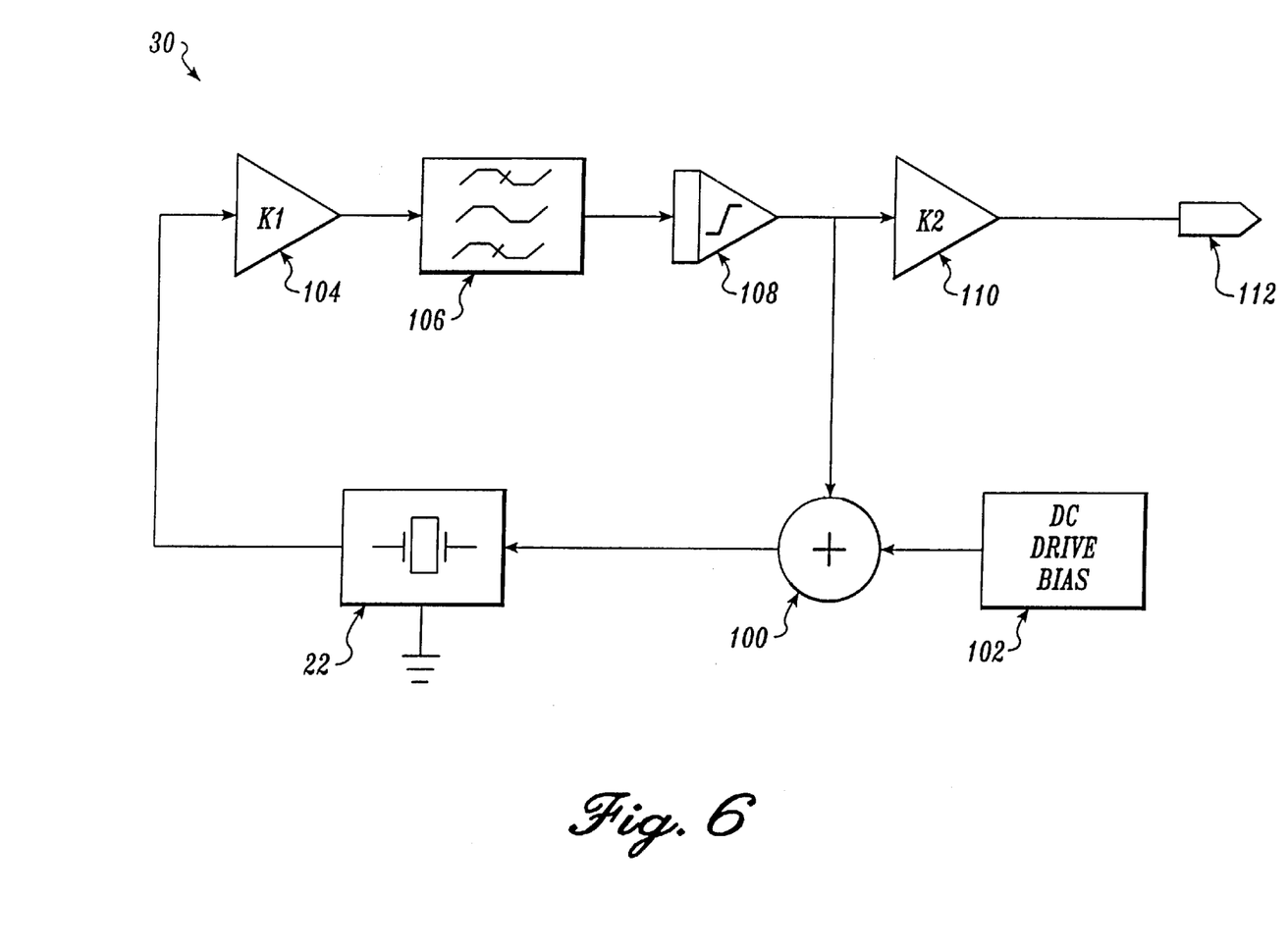
FIG. 6 is a block diagram of an electrical circuit for driving the transducer of FIG. 3.

FIG. 6 illustrates a representative oscillation circuit in which vibrating beams 50, 52 of transducers 22, 24 function as a resonator. A transimpedance amplifier 104 converts a sense current received from vibrating beams 50, 52 to a voltage. This voltage is filtered by a bandpass filter 106, which reduces noise, and its amplitude is controlled by an amplitude limiter 108. The resulting signal is combined with the output or DC bias voltage from a DC source 102 in a summing junction 100. The DC bias voltage generates a force between electrodes 62, 64 and beam 50, 52. The signal from amplitude limiter 108 modulates this force causing beams 50, 52 to vibrate laterally at their resonant frequency. This lateral beam motion, in turn, generates the sense current. An output buffer 110 isolates the oscillator from external circuitry connected to an output 112 of oscillation circuit 30. The gain in oscillation circuit 30 sustains oscillation of beams 50, 52.

As shown in FIG. 1, forces applied to proof mass 18 will cause proof mass 18 to rotate about hinge axis 20. This rotation generates an axial force against transducers 22, 24. The axial force applied to transducers 22, 24 proportionally changes the vibration frequency of beams 50, 52 in each transducer 22, 24. To minimize changes in the vibration frequency of beams 50, 52 that are not related to the applied force, it is advantageous to have a relatively high velocity from the vibrational motion of beams 50, 52. The vibrational velocity is generally proportional to the resonance amplification factor (Q) and, therefore, it is generally considered beneficial to maximize the Q of vibratory transducers 22, 24. Typically, Q is maximized by partially evacuating accelerometer 2 to reduce damping of beams 50, 52. This is because the air between the moving beams 50, 52 and the electrodes 62, 64 dampens the movement of beams 50, 52 toward electrodes 62, 64. More importantly, however, it is desirable to provide gas damping of proof mass 18 to minimize the vibration of proof mass 18 that is not related to an applied force. For example, if a force were applied to mass 18 in a vacuum or near vacuum, the mass 18 would continue to swing back and forth about inner flexures 14, 16 until it eventually slowed to a halt. Undesirable resonance can also be caused by vibrations in the surrounding environment (other than the applied force) that cause the proof mass to oscillate. Gas damping of proof mass 18 minimizes these undesirable oscillations.

Applicant has found that intermeshed beam and electrode fingers 80, 82 decrease the damping of beams 50, 52 at pressures above vacuum on the order of 5 to 10 times. In fact, transducers 22, 24 of the present invention operate effectively in air having substantially higher pressure levels than vacuum (on the order 0.1 to 1 atmosphere). Applicant believes that this occurs because a portion of the air between beams 50, 52 and electrodes 62, 64 is located in the axial gaps between beam and electrode fingers 80, 82. Since fingers 80, 82 are not moving toward and away from each other, this portion of the air contributes substantially less to the damping of the beams 50, 52. Accordingly, transducers 22, 24 can be operated at atmospheric pressure, which allows proof mass 18 to be gas damped to minimize proof mass motion from input vibration for improved transducer linearity and bandwidth.

Referring to FIG. 7, the method of manufacturing accelerometer 2 according to the present invention will now be described. Insulating layers 35, 36 of silicon oxide are first applied to upper and lower surfaces 27, 29 of a semiconducting substrate 32. Preferably, oxide layers 35, 36 are grown on upper and lower surfaces 27, 29 of a silicon wafer 32 to form a double-sided SOI substrate, as shown in FIG. 7. First and second active layers 31, 33 of semiconducting material are then bonded to the silicon oxide layers 35, 36 on either side of the substrate 32 so that the silicon oxide layers 35, 36 insulate the substrate 32 from the active layers 31, 33. Active layers 31, 33 are preferably attached to substrate 32 by molecular bonding at elevated temperatures (e.g., on the order of about 300° C. to 500° C.). In a preferred configuration, portions of the active layers 31, 33 will be removed after they have been bonded to the substrate 32 to provide relatively thin active layers 31, 33 of about 5 to 40 micrometers, preferably about 10 to 30 micrometers. Portions of the silicon wafer 32 may also be removed prior to the oxidation step to form a substrate 32 with a thickness of about 300 to 700 micrometers, preferably about 400 to 600 micrometers.

Proof mass 18 and instrument frames 6, 8 are then etched into substrate 32 so that proof mass 18 is suspended from inner frame 8 by flexures 14, 16, and transducers 22, 24 are etched into active layers 31, 33. Insulating layers 35, 36 inhibit undesirable etching of transducers 22, 24 while the substrate 32 is being etched and vice versa. First and second parallel beams 50, 52 are etched, preferably with reactive ion etching, into the active layers 31, 33. Electrodes 62, 64 are etched from active layers 31, 33 and doped with a suitable conductive material to create the necessary charge carriers and to facilitate completion of the electrical circuit. After the accelerometers components are formed into the silicon wafers 31, 32, 33, the beams 50, 52 are mechanically coupled to proof mass 18 and inner frame 8, and the electrodes 62, 64 are capacitively coupled to oscillator circuit 30.

FIG. 8 schematically illustrates another method of manufacturing accelerometer 2 according to the present invention. As shown, a pair of single-sided SOI substrates 130, 132 may be formed by oxidizing a planar surface 134 of two silicon wafers 136, 138. The opposite surfaces 140 of substrates 136, 138 are then bonded together (e.g., by molecular bonding at elevated temperatures) to form silicon body 4. Active layers 31, 33 are then attached to the oxidized surfaces 134 of wafers 136, 138 and the transducers 22, 24 and proof mass 18 are etched as described above.

Although the foregoing invention has been described in detail for purposes of clarity, it will be obvious that certain modifications may be practiced within the scope of the appended claims. For example, although the present invention is particularly useful for electrostatically driven resonators, it may also be used with other drive means, such as piezoelectric drives, electromagnetic drives, thermal drives or the like.

What is claimed is:

1. An accelerometer comprising:
   a substrate comprising a semiconducting material and defining first and second opposite surfaces, the substrate having a frame and a proof mass suspended from the frame by one or more flexures;
   first and second active layers of semiconducting material coupled to the first and second surfaces of the substrate, respectively, wherein the first active layer comprises a first vibratory force transducer and the second active layer comprises a second vibratory force transducer, said first and second vibratory force transducers are mechanically coupled to the proof mass and the frame for detecting a force applied to the proof mass;
   an insulating layer between each active layer and the substrate to insulate the vibratory transducers from the substrate, and
   a circuit coupled to the vibratory force transducers for driving and sensing the vibratory force transducer
   wherein the vibratory force transducers each comprise first and second parallel beams each having a first end portion fixed to the proof mass, a second end portion fixed to the frame and a resonating portion between said first and second end portions, and first and second electrodes positioned adjacent to and laterally spaced from the first and second beams,
   wherein the beams each have one or more fingers extending laterally outward from the beams, the electrodes each comprising one or more fingers projecting laterally inward toward the beams and intermeshed with the beam fingers.

2. The apparatus of claim 1 wherein the one or more flexures are substantially centered between the first and second surfaces of the substrate.

3. The apparatus of claim 1 wherein the substrate and the active layers each comprise a silicon wafer.

4. The apparatus of claim 1 wherein the insulating layers each comprise a layer of silicon oxide epitaxially grown on the first and second surfaces of the substrate.

5. The apparatus of claim 4 wherein the silicon oxide layer is about 0.1 to 10 micrometers thick.

6. The apparatus of claim 1 wherein the substrate is about 300 to 700 micrometers thick and the active layers are about 5 to 40 micrometers thick.

7. The apparatus of claim 1 wherein the substrate further comprises:
   a pair of silicon wafers, said silicon wafers bonded together to form said substrate; and
   wherein said insulating layers are applied to said first opposite surface of said substrate and to said second opposite surface of said substrate.

8. The apparatus of claim 2 wherein the proof mass comprises first and second sides with the one or more flexures being substantially centered between the first and second surfaces of the substrate on the first side of the proof mass, a proof mass axis of rotation extending between said one or more flexures and an effective hinge point located between said one or more flexures.

9. The apparatus of claim 8 wherein the vibratory force transducers of the first active layer is located on the first side of the proof mass along an axis perpendicular to the rotation axis and extending across the hinge point, wherein the vibratory force transducers of the second active layer is located on the first side of the proof mass along an axis perpendicular to the rotation axis and extending across the hinge point.

10. The apparatus of claim 8 wherein the vibratory force transducers are both located on the second side of the proof mass opposite the hinge point.

11. The apparatus of claim 8 wherein one of the vibratory force transducers is located on the side of the proof mass along an axis perpendicular to the rotation axis and extending across the hinge point and the other of the vibratory force transducers is located on the second side of the proof mass opposite the hinge point along said axis perpendicular to the rotation axis.

12. The apparatus of claim 1 further comprising an oscillating circuit coupled to the electrodes for electrostatically vibrating the beams in a substantially lateral direction.

13. The apparatus of claim 1 further comprising means for detecting a vibration frequency of the beam and means for determining a magnitude of a force applied to the proof mass based on the vibration frequency of the beam.

14. A method for making an accelerometer for detecting an applied force comprising:

forming insulating layers on opposite surfaces of a semiconductor wafer;

forming first and second active layers on the formed insulating layers on opposite surfaces of the semiconductor wafer;

suspending a proof mass from a stationary frame on the semiconductor wafer, the proof mass having first and second opposite surfaces;

forming a first vibratory force transducer in the first active layer;

forming a second vibratory force transducer in the second active layer, wherein forming each of the first and second vibratory force transducers further comprises forming first and second parallel beams with a first end portion fixed to the proof mass, a second end portion fixed to the frame and a resonating portion between said first and second end portions and forming one or more fingers extending laterally outward from the beams;

mechanically coupling the first vibratory force transducer to the frame and to the first opposite surface of the proof mass;

mechanically coupling the second vibratory force transducer to the frame and to the second opposite surface of the proof mass;

electrically coupling the first and second vibratory force transducers to a circuit adapted for driving and sensing the vibratory force transducer; and forming first and second electrodes adjacent to and laterally spaced from the first and second beams, wherein the electrodes are formed with one or more fingers protecting laterally inward toward the beams and intermeshed with the beam fingers;

wherein the vibratory force transducers are each capable of detecting a force applied to the proof mass.

* * * * *